United States Patent
Hale et al.

(10) Patent No.: US 11,019,958 B2
(45) Date of Patent: Jun. 1, 2021

(54) FLAMELESS NON-ELECTRIC CHAFING DISH

(71) Applicant: H&H HEATING SOURCES, LLC, Newburgh, IN (US)

(72) Inventors: Austin J. Hale, Evansville, IN (US); Logan Hayford, Newburgh, IN (US); David Treptow, Vista, CA (US); Jeff Imray, Vista, CA (US)

(73) Assignee: H&H Heating Sources, LLC, Newburgh, IN (US)

( * ) Notice: Subject to any disclaimer, the term of this patent is extended or adjusted under 35 U.S.C. 154(b) by 28 days.

(21) Appl. No.: 15/284,651

(22) Filed: Oct. 4, 2016

(65) Prior Publication Data

US 2018/0092493 A1 Apr. 5, 2018

(51) Int. Cl.
*A47J 36/28* (2006.01)
*A47J 36/24* (2006.01)

(52) U.S. Cl.
CPC .......... *A47J 36/28* (2013.01); *A47J 36/2405* (2013.01)

(58) Field of Classification Search
CPC ........ A47J 36/24; A47J 36/2405; A47J 36/28; A47J 36/2494; A47J 36/30; A47J 39/006; A47J 37/0763; F24V 30/00; B65D 81/3484
USPC .......................................................... 99/483
See application file for complete search history.

(56) References Cited

U.S. PATENT DOCUMENTS

| | | | | |
|---|---|---|---|---|
| 4,510,919 A | * | 4/1985 | Benmussa ............... | A45C 11/20 126/263.08 |
| 4,762,113 A | * | 8/1988 | Hamasaki ............... | A47J 36/28 126/261 |
| 5,440,975 A | * | 8/1995 | Bean .................... | A47J 36/2494 126/246 |
| 5,477,847 A | * | 12/1995 | Ueki ...................... | F24V 30/00 126/263.07 |
| 5,493,874 A | * | 2/1996 | Landgrebe ............. | A47J 47/14 62/263 |
| 5,611,329 A | * | 3/1997 | Lamensdorf ........... | A47J 36/28 126/263.05 |
| 5,638,743 A | * | 6/1997 | Lo ....................... | A47J 37/0763 126/25 R |

(Continued)

*Primary Examiner* — Erin E McGrath
(74) *Attorney, Agent, or Firm* — Martin IP Law Group; C. Richard Martin

(57) ABSTRACT

An improved flameless, non-electric chafing dish and an improved flameless non-electric heat source for use in connection therewith is provided. The chafing dish assembly includes a support frame for supporting the chafing dish on a serving surface, a lower (water) pan positioned on the support frame and having a bottom and one or more side walls, a food pan configured to nest inside the lower pan and having a bottom and one or more side walls, and an air-activated exothermic warming device positioned between the lower pan and the food pan. The warming device comprises a mixture of materials including iron which produce heat from the exothermic oxidation of iron when exposed to air. A support device configured for positioning between the air-activated exothermic warming device and the lower (water) pan is also provided. The support device is configured to permit airflow to the warming device and to elevate the warming device into direct contact with the food pan.

17 Claims, 5 Drawing Sheets

(56) References Cited

U.S. PATENT DOCUMENTS

| | | | |
|---|---|---|---|
| 5,984,995 A * | 11/1999 | White | A61F 7/034 |
| | | | 75/230 |
| 5,990,455 A | 11/1999 | Scott et al. | |
| 6,157,007 A | 12/2000 | Scott, III | |
| 2006/0005827 A1 * | 1/2006 | Consoli | F24V 30/00 |
| | | | 126/263.06 |

* cited by examiner

FLAMELESS NON-ELECTRIC CHAFING DISH

BACKGROUND OF THE INVENTION

Field of the Invention

The present invention relates to devices for keeping food warm. More specifically, the present invention relates to buffet type food serving trays or chafing dishes that are designed to keep food warm while being served.

Description of the Related Art

Chafing dishes are widely used for serving food in buffet and other settings. As shown in FIG. 1, prior art chafing dishes 10 typically include a frame 12 supporting a water pan 14 with a heat source such as one or more cans of chafing fuel 16a, 16b positioned beneath the water pan 14 to heat water in the water pan 14. The fuel used in the cans 16a, 16b is typically either an alcohol base material or an oil and wick configuration. A food pan 18 is supported by the water pan 14 above the level of the water. The flames from the fuel cans 16a, 16b heat the water in the water pan 14 to warm the food in the food pan 16. Finally, a removable cover 19 may be used to cover the food to protect it from external debris and to further aid in keeping the food warm.

Several drawbacks exist in the use of canned fuels as a heat source. Obviously, the use of a fuel source having an open flame presents a fire hazard. In addition, where alcohol is used, the alcohol materials tend to vapor lock so that flame size varies and produces uneven heat. Diaphragms are sometimes provided that are adjustable to control the size of the flame and with it hopefully the amount of heat produced. The problem with these diaphragms is that with the tendency of the alcohol type fuel to vaporize, the flame is often extinguished. The vapors from the burning fuel may also produce soot and/or harmful or unpleasant odors.

Other chafing dishes have been proposed which use electrical heaters rather than flames to heat the water. These electrically heated chafing dishes also have drawbacks. The primary drawback to chafing dishes using electrical heaters is the requirement of an electrical outlet or source of electrical power nearby to power the unit. Also, because water is present in the water pan, the inherent danger of using electricity in close proximity to water presents a significant danger of electrocution and/or fire.

Accordingly, there is a need for a heat source for a chafing dish that is safe in that it is flameless and does not require connection to an external electrical power source. There is further a need to provide such a heat source that is easy to store, easy to use, easy to transport, and most of all easy to set up. There is a further need to provide a heating source that provides reliable heat in any environment, indoor or outdoor. There is yet a further need to provide a heating source that does not produce malodorous and potentially harmful or dangerous fumes during use. There is also a need for a heat source that can heat the food to the correct temperature to keep it warm without a flame, electricity or water.

SUMMARY OF THE INVENTION

It is therefore an object of the present invention to provide a flameless, non-electric heat source for a chafing dish that is easy to store, easy to use, easy to transport, and easy to set up.

It is also an object of the invention to provide a safe and reliable heat source for a chafing dish that provides reliable heat in any environment, indoor or outdoor.

A further object of the invention is to provide a heat source for a chafing dish that does not create soot or odor from the burning of potentially harmful and dangerous chemicals.

The present invention meets these objects by providing a heat source for a chafing dish that provides heat at the appropriate temperature without a flame, electricity or water.

According to one presently preferred embodiment of the invention, there is provided a warming device for use in connection with a chaffing dish. The warming device includes an air-activated exothermic heat source, which is configured for positioning between a water pan of the chafing dish and a food pan of the chafing dish. The heat source is comprised of a mixture of materials including iron which produce heat from the exothermic oxidation of iron when exposed to air. The mixture of materials is positioned in a pocket between an upper layer of material and a lower layer of material.

According to another presently preferred embodiment of the invention, there is provided a flameless, non-electric chafing dish. The chafing dish includes a support frame for supporting the chafing dish on a serving surface, a lower pan positioned on the support frame and having a bottom and one or more side walls, a food pan configured to nest inside the lower pan and having a bottom and one or more side walls, and an air-activated exothermic heat source positioned between the lower pan and the food pan. The heat source comprises a mixture of materials including iron which produce heat from the exothermic oxidation of iron when exposed to air. The mixture of materials is preferably positioned in a pocket between an upper layer of material and a lower layer of material. An annular air gap may also be provided between the lower pan and the food pan.

According to one aspect of the invention, the mixture of materials associated with the heat source may include cellulose, iron, water, activated carbon, vermiculite and salt. The upper layer of material and the lower layer of material may be an air permeable material, preferably one that exhibits a perforation pattern that permits airflow to the mixture of materials. The material may preferably be a non-woven material. The heat source may further include a plurality of pockets between the upper layer and lower layer of material.

A further aspect of the invention is to provide a support device configured for positioning between the air-activated exothermic heat source and the water pan. The support device may include an upper surface for engaging the lower layer of material of the heat source and means for elevating the upper surface above the surface of the water pan. The support device may further include a plurality of openings therein for permitting airflow. The elevating means may be of a height sufficient to place the upper layer of material of the heat source into contact with the lower surface of the food pan. The support device is formed of a metallic material selected from a group consisting of aluminum and stainless steel. Alternatively, the support device may be formed of a plastic material.

These and other objects, features and advantages of the present invention will become apparent from a review of the following drawings and detailed description of the preferred embodiments of the invention.

BRIEF DESCRIPTION OF THE DRAWINGS

The present invention can best be understood in connection with the accompanying drawings. It is noted that the invention is not limited to the precise embodiments shown in the drawings, in which.

DETAILED DESCRIPTION OF THE INVENTION

Figure 1:
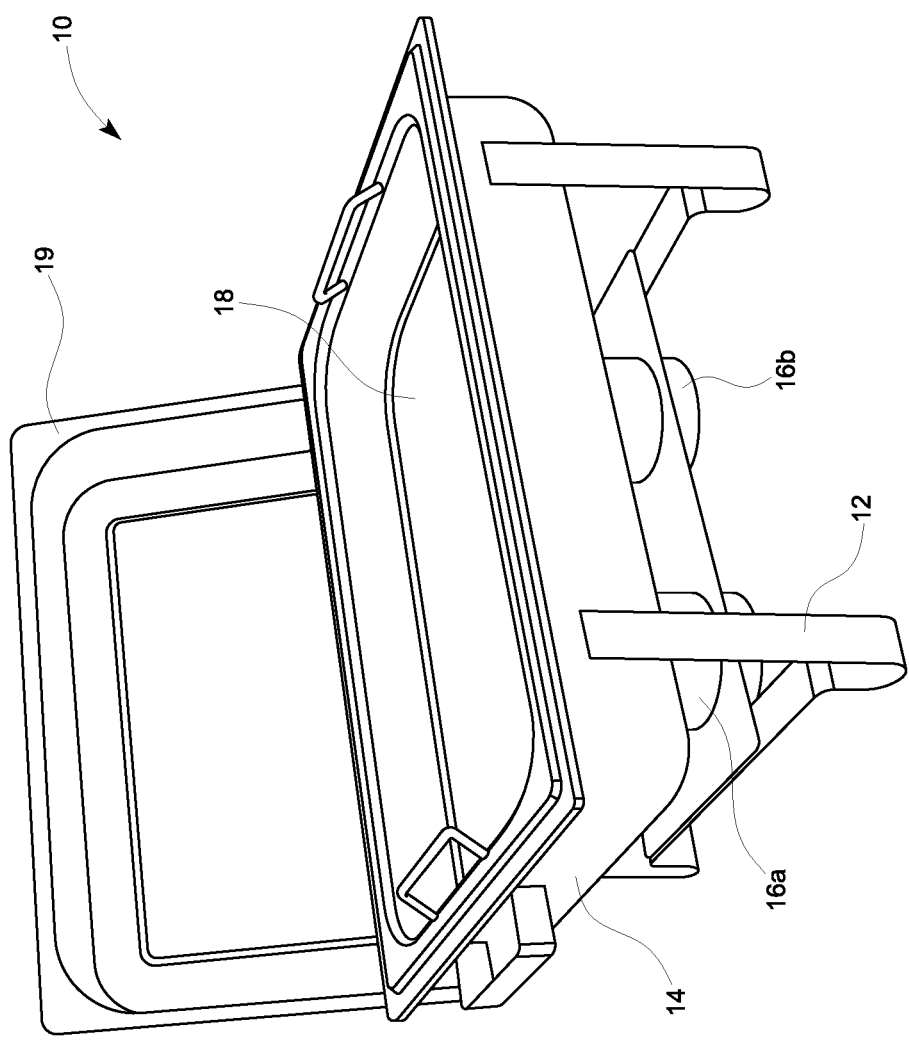
FIG. 1 is a perspective view of a chafing dish with canned heat source according to the prior art.

For purposes of promoting and understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

Figure 2:
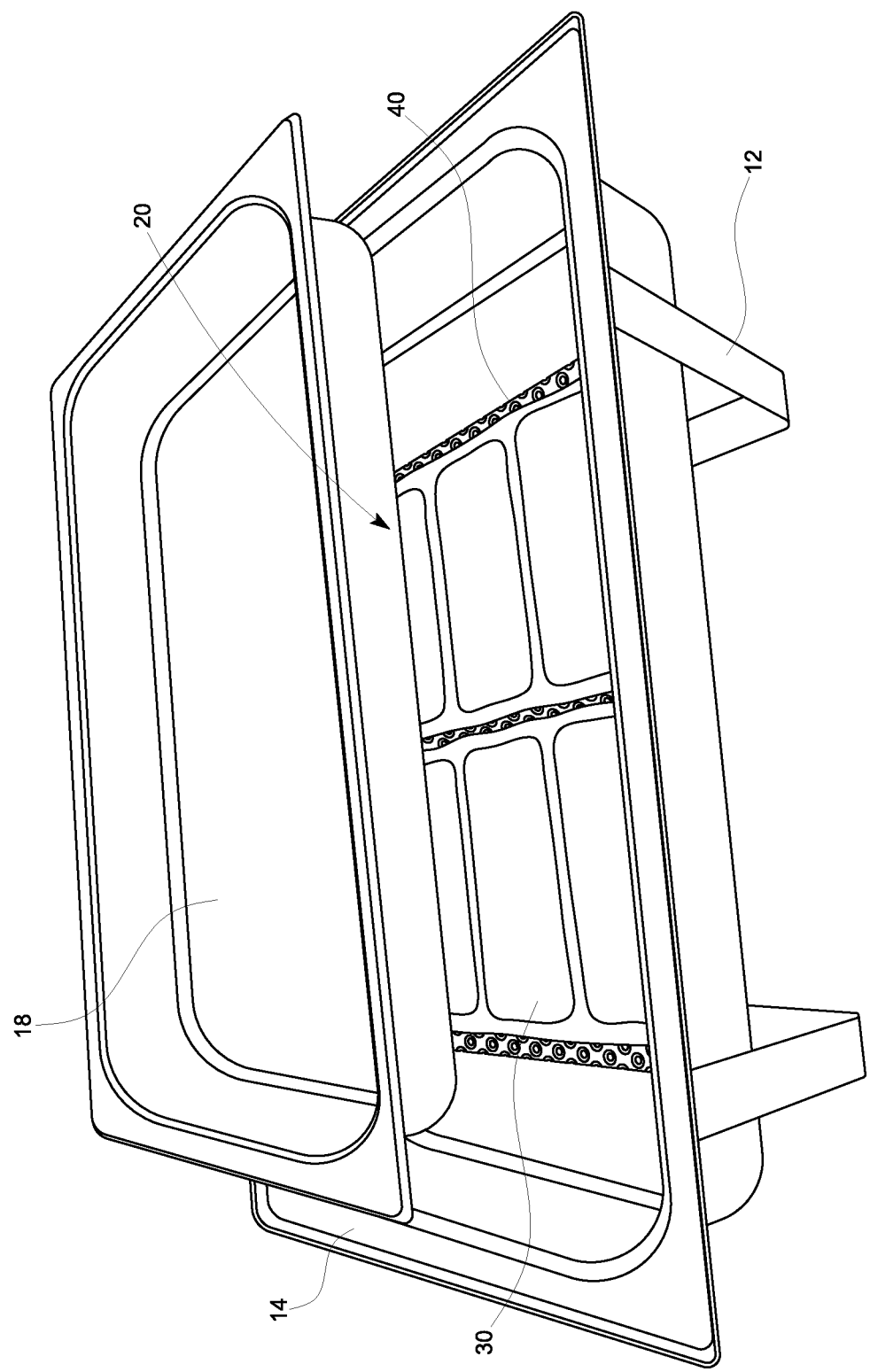
FIG. 2 is a perspective view of a chafing dish with an improved heat source according to a preferred embodiment of the present invention.

As best shown in FIG. 2, one presently preferred embodiment of the invention comprises an improved warming device 20 for a chafing dish assembly 10. The main components of the chafing dish assembly: frame 12, water pan 14 and food pan 18 are the same as, or similar to those in prior art assemblies such as shown in FIG. 1 and will not be further described here. Instead of using a heat source such as fuel cans 16a, 16b located beneath the water pan 14 that is filled with water for heating, the present invention provides an improved warming device 20 positioned between the water pan 14 and the food pan 18.

The improved warming device 20 according to the present invention includes one or more air-activated exothermic heat sources 30a, 30b which are placed on a support device 40 such that the upper surfaces 32a, 32b of the one or more air-activated exothermic heat sources 30a, 30b are in direct contact with the lower surface of the food pan 18 when in use.

Figure 4:
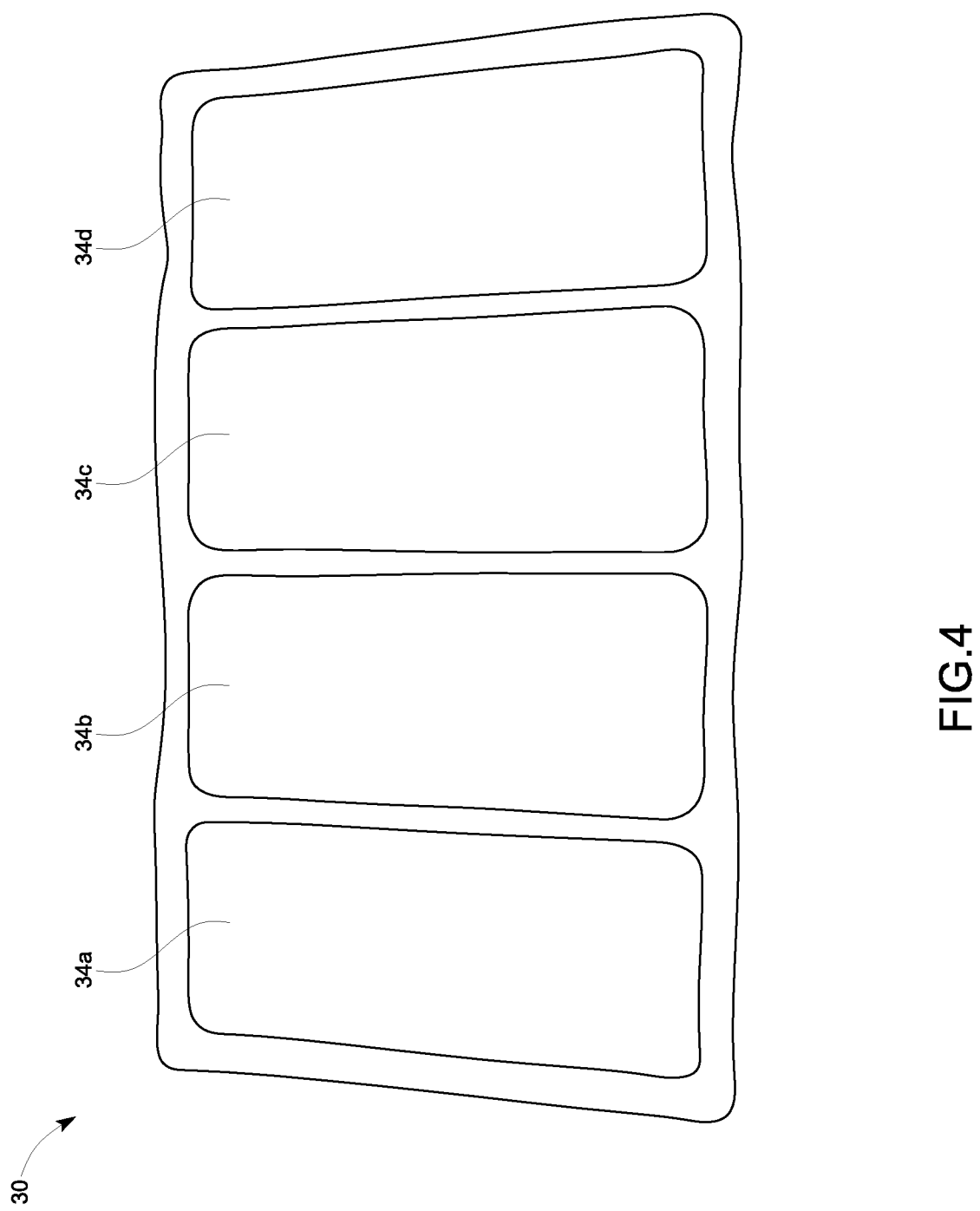
FIG. 4 is a top view of an air-activated exothermic warmer which is a part of the improved heat source of the device shown in FIG. 2 and FIG. 3.

FIG. 4 shows one presently preferred embodiment of an air activated heat source 30 of the improved warming device 20 of the present invention. The air activated heat source 30 shown in FIG. 4 includes one or more pockets 34a, 34b, 34c, 34d disposed between two layers of material. While FIG. 4 shows four pockets, any number of pockets may be utilized so long as the desired airflow can be achieved to reach the necessary temperatures. Each pocket contains a propriety mixture of materials including cellulose, iron, water, activated carbon, vermiculite and salt which produce heat from the exothermic oxidation of iron when exposed to air. The proprietary mixture of materials, when activated, produces heat at temperatures of not less than 165 degrees Fahrenheit. The material of the air activated heat source 30 is preferably an air permeable material which has a perforation pattern as shown in FIG. 4 that permits sufficient airflow to the mixture to produce the desired amount of heat. Although woven fabrics may be used, the material is preferably a non-woven material.

Figure 3:
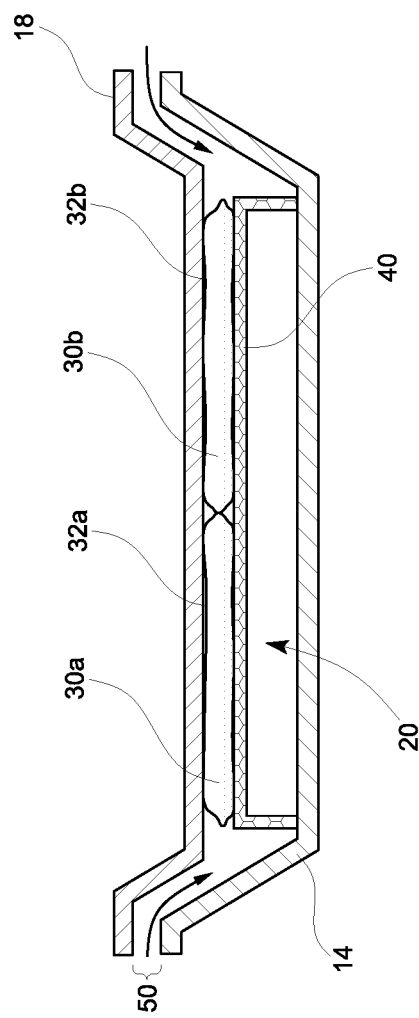
FIG. 3 is a side sectional view of a portion of the chafing dish with improved heat source shown in FIG. 2
Figure 5:
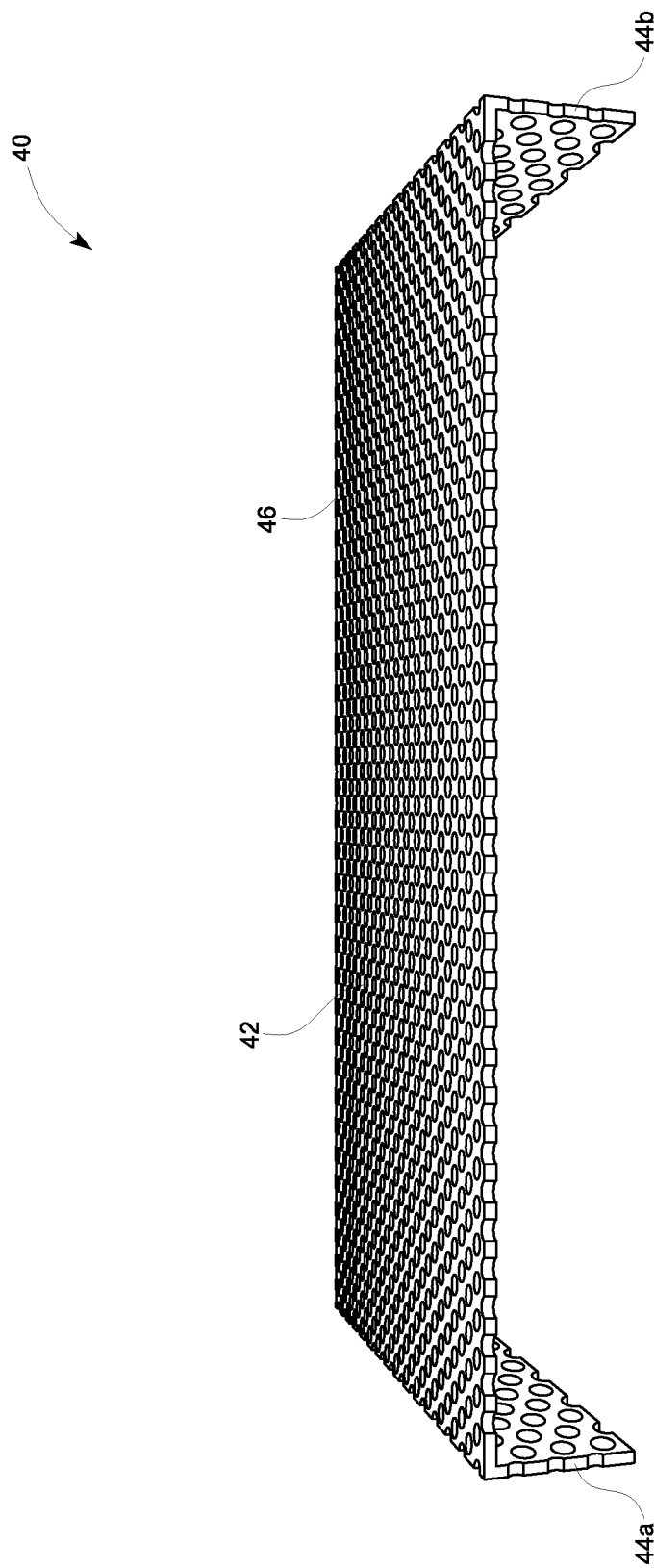
FIG. 5 is a side elevation view of a support device which is a part of the improved heat source of the device shown in FIG. 2 and FIG. 3.

FIG. 5 shows one presently preferred embodiment of a support device 40 of the improved warming device 20 of the present invention. The support device 40 includes an upper surface 42 for supporting said one or more air activated heat sources 30. The upper surface 42 of the support device 40 is elevated a distance above the water pan 14 by substantially vertical supports 44a, 44b. The support device 40 further includes a plurality of openings 46 therein for allowing air to pass through the support device 40 to activate the contents of the air activated heat source 30. By elevating the upper surface 42, and thereby the air activated heat source 30 above the water pan 14, and by providing a plurality of openings 46 in the support device 40, adequate airflow is provided to the lower surface of the air activated heat source 30 to activate and maintain the heat that needs to be produced to keep food warm. Thus, the supporting device 40 performs two essential functions. First, it elevates a portion of or all of the upper surface 32 of the air activated heat source 30 into close proximity with and/or into direct contact with the lower surface of the food pan thereby effectively transferring heat to the pan. Second, the supporting device permits air to come into contact with the lower surface of the air activated heat source 30 thereby producing the maximal amount of heat. As shown in FIG. 3, an annular air gap 50 is also provided between the water pan 14 and food pan 18 when the device is assembled to allow additional outside air flow to enter the space and come into contact with the air activated heat source 30. The support device may be formed of any material and may have any dimensions as are sufficient to support the air activated heat source 30 in the desired position. Metallic materials are preferred for the support device 40 as they provide better heat dispersion and heat reflection properties than other materials. At present, stainless steel and/or aluminum are preferred as they are rust resistant and provide superior heat dispersion and reflection properties. The material of the supporting device may be of any thickness necessary to support the air activated heat source 30. Presently preferred embodiments of the invention use either 18 ga or 14 ga aluminum. Alternatively, other materials, such as plastics, may be used where different issues or concerns are present. This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

We claim:

1. A flameless, non-electric chafing dish comprising:
   a support frame for supporting the chafing dish on a serving surface;
   a lower pan having a bottom and one or more side walls, said lower pan positioned on said support frame;
   a food pan having a bottom and one or more side walls, said food pan being configured to nest inside said lower pan;
   a support device positioned between said lower pan and said food pan, said support device including a planar member that is elevated above the bottom of the lower pan by one or more supports extending downwardly from the planar member of said support device, wherein the planar member of the support device further includes a plurality of openings therein for permitting airflow;

an air-activated exothermic heat source positioned on an upper surface of the planar member of the support device such that an upper surface of the heat source is proximal to the bottom of the food pan, said heat source comprising a mixture of materials including iron which produce heat from exothermic oxidation of the iron when exposed to air, said mixture of materials being positioned in a pocket between an upper layer of material and a lower layer of material; and a continuous annular air gap between the lower pan and the food pan; said annular air gap configured to allow for the free flow of air between an area surrounding the chafing dish and an area between the bottom of the lower pan and the bottom of the food pan.

2. The chafing dish according to claim 1 wherein the mixture of materials includes cellulose, iron, water, activated carbon, vermiculite and salt.

3. The chafing dish according to claim 1 wherein the upper layer of material and the lower layer of material are air permeable material that permits airflow to the mixture of materials.

4. The chafing dish according to claim 3 wherein the air permeable material exhibits a perforation pattern and is a non-woven material.

5. The chafing dish according to claim 1 comprising a plurality of pockets between the upper layer and lower layer of material.

6. The chafing dish according to claim 1 wherein said one or more supports are of a height sufficient to place the upper layer of material of the heat source into contact with the lower surface of the food pan.

7. The chafing dish according to claim 1 wherein the support device is formed of a metallic material selected from a group consisting of aluminum and stainless steel.

8. The chafing dish according to claim 1 wherein the support device is formed of a plastic material.

9. A warming device for keeping cooked food warm comprising:

a lower container having a bottom and one or more side walls;

an upper container having a bottom and one or more side walls, said upper container being configured to nest inside said lower container;

a continuous annular air gap between the lower container and the upper container; said annular air gap configured to allow for the free flow of air between an area surrounding the warming device and an area between the bottom of the lower container and the bottom of the upper container;

a support device positioned between said lower container and said upper container, said support device including a planar member that is elevated above the bottom of the lower container by one or more supports extending downwardly from the planar member of said support device, wherein the planar member of the support device further includes a plurality of openings therein for permitting airflow; and an air-activated exothermic heat source positioned on an upper surface of the planar member of the support device such that an upper surface of the heat source is proximal to the bottom of the upper container.

10. The warming device according to claim 9, wherein said heat source comprises a mixture of materials including iron which produce heat from exothermic oxidation of the iron when exposed to air, said mixture of materials being positioned in a pocket between an upper layer of material and a lower layer of material.

11. The warming device according to claim 10, wherein the mixture of materials includes cellulose, iron, water, activated carbon, vermiculite and salt.

12. The warming device according to claim 10 wherein the upper layer of material and the lower layer of material are air permeable material that permits airflow to the mixture of materials.

13. The warming device according to claim 12 wherein the air permeable material exhibits a perforation pattern and is a non-woven material.

14. The warming device according to claim 10 comprising a plurality of pockets between the upper layer and lower layer of material.

15. The warming device according to claim 9 wherein said one or more supports are of a height sufficient to place the upper layer of material of the heat source into contact with the lower surface of the upper container.

16. The warming device according to claim 9 wherein the support device is formed of a metallic material selected from a group consisting of aluminum and stainless steel.

17. The warming device according to claim 9 wherein the support device is formed of a plastic material.

* * * * *